(12) United States Patent
Gibby

(10) Patent No.: US 10,443,470 B2
(45) Date of Patent: Oct. 15, 2019

(54) NITROGEN OXIDE SIGNAL MULTIPLEXING SYSTEM

(71) Applicant: Cummins Emission Solutions, Inc., Columbus, IN (US)

(72) Inventor: Dale G. Gibby, Columbus, IN (US)

(73) Assignee: Cummins Emission Solutions, Inc., Columbus, IN (US)

( * ) Notice: Subject to any disclaimer, the term of this patent is extended or adjusted under 35 U.S.C. 154(b) by 191 days.

(21) Appl. No.: 15/526,857

(22) PCT Filed: Nov. 16, 2015

(86) PCT No.: PCT/US2015/060913
§ 371 (c)(1),
(2) Date: May 15, 2017

(87) PCT Pub. No.: WO2016/081377
PCT Pub. Date: May 26, 2016

(65) Prior Publication Data
US 2017/0321583 A1    Nov. 9, 2017

(30) Foreign Application Priority Data
Nov. 21, 2014    (CN) .................. 2014 2 0706658 U

(51) Int. Cl.
*F01N 3/00*    (2006.01)
*F01N 3/20*    (2006.01)
(Continued)

(52) U.S. Cl.
CPC ............. *F01N 3/208* (2013.01); *F01N 3/035* (2013.01); *F01N 3/106* (2013.01); *F01N 11/007* (2013.01);
(Continued)

(58) Field of Classification Search
CPC ............. F01N 11/007; F01N 2560/026; F01N 2900/0416; F01N 2900/1402
See application file for complete search history.

(56) References Cited

U.S. PATENT DOCUMENTS 3,684,000 A    8/1972    Van Deberg
3,962,866 A *  6/1976    Neidhard ............. F01N 11/002
                                                        60/276
(Continued)

FOREIGN PATENT DOCUMENTS

CN    101003076    7/2007
CN    201832953    5/2011
(Continued)

OTHER PUBLICATIONS

First office Action for Chinese Patent Application No. 20130060691.8, dated Mar. 21, 2016, 6 pages.
(Continued)

*Primary Examiner* — Audrey K Bradley
*Assistant Examiner* — Anthony Ayala Delgado
(74) *Attorney, Agent, or Firm* — Foley & Lardner LLP

(57) ABSTRACT

Nitrogen oxide multiplexing systems are provided. Various embodiments provide for systems comprising an aftertreatment component configured to treat exhaust exiting an engine, a sensor, a conduit, and a switching device. The sensor is configured to detect nitrogen oxide in the exhaust from both upstream of and downstream of an aftertreatment component. The conduit has a first end positioned upstream of the aftertreatment component and a second end communicable with the sensor positioned downstream of the aftertreatment component. The conduit receives a sample of the exhaust flowing from upstream of the aftertreatment component through the first end and delivers the sample of the exhaust to the sensor through the second end. The switching device is connected to the conduit and configurable to
(Continued)

selectively prevent the flow of exhaust upstream of the aftertreatment component from reaching the sensor.

36 Claims, 7 Drawing Sheets

(51) Int. Cl.
*F01N 3/10* (2006.01)
*F01N 3/035* (2006.01)
*F01N 13/00* (2010.01)
*F01N 11/00* (2006.01)

(52) U.S. Cl.
CPC ...... *F01N 13/009* (2014.06); *F01N 2560/026* (2013.01); *F01N 2610/02* (2013.01); *F01N 2610/148* (2013.01); *F01N 2900/0416* (2013.01); *F01N 2900/1402* (2013.01); *Y02T 10/24* (2013.01)

(56) References Cited

U.S. PATENT DOCUMENTS

| | | | |
|---|---|---|---|
| 3,965,677 A | 6/1976 | Goto et al. | |
| 5,265,417 A * | 11/1993 | Visser | F01N 11/00 60/274 |
| 5,798,270 A * | 8/1998 | Adamczyk, Jr. | F01N 3/0807 423/230 |
| 6,205,959 B1 | 3/2001 | Smetan et al. | |
| 7,013,948 B1 | 3/2006 | Grebe et al. | |
| 7,255,098 B1 * | 8/2007 | Boley | F01N 9/00 123/679 |
| 7,263,823 B2 | 9/2007 | Andrews et al. | |
| 7,621,250 B2 | 11/2009 | Iizumi et al. | |
| 2003/0172884 A1 | 9/2003 | Laufenberg et al. | |
| 2004/0118364 A1 | 6/2004 | Hughes et al. | |
| 2007/0163744 A1 | 7/2007 | Douro et al. | |
| 2010/0199634 A1 | 8/2010 | Heaton | |
| 2012/0090296 A1 * | 4/2012 | Yacoub | F01N 3/208 60/274 |
| 2013/0104530 A1 | 5/2013 | Geveci | |
| 2013/0213013 A1 * | 8/2013 | Mitchell | F01N 11/00 60/276 |

FOREIGN PATENT DOCUMENTS

| | | |
|---|---|---|
| DE | 20314369 | 6/2004 |
| DE | 10 2014 009 739 | 1/2015 |
| EP | 1 336 746 | 8/2003 |
| WO | WO 2008/059330 | 5/2008 |
| WO | WO 2012/102666 | 8/2012 |

OTHER PUBLICATIONS

International search report and Written Opinion Issued for PCT Application No. PCT/US2015/060913, dated Jan. 22, 2016,10 pages.
The International Search Report and Written Opinion of the International Searching Authority issued in PCT/US2013/071955, dated Jun. 18, 2014.

* cited by examiner

NITROGEN OXIDE SIGNAL MULTIPLEXING SYSTEM

CROSS REFERENCE TO RELATED APPLICATIONS

The present application is a National Stage of PCT Application No. PCT/US2015/060913, filed Nov. 16, 2015, which claims the benefit of priority to Chinese Utility Model Application No. ZL201420706658.X, filed Nov. 21, 2014. The contents of both applications are herein incorporated by reference in their entirety.

TECHNICAL FIELD

The present disclosure relates generally to signal multiplexing systems for use with aftertreatment systems that treat exhaust from internal combustion engines.

BACKGROUND

Selective catalytic reduction exhaust aftertreatment systems are an important technology for reducing harmful emissions from internal combustion engines. Selective catalytic reduction catalyst aftertreatment systems generally include a storage source for reductant (for example, diesel exhaust fluid) and a dosing unit that includes at least one of a pump unit for pressurizing the reductant. The selective catalytic reduction catalyst aftertreatment systems may also include a metering unit controlled by a control system to provide a controlled amount or rate of reductant into the exhaust stream. An injector provides a reductant solution to a decomposition region of an exhaust flow path located upstream of a selective catalytic reduction catalyst.

The control system typically requires signals from a nitrogen oxide sensor from both before and after the selective catalytic reduction catalyst. Current selective catalytic reduction catalyst aftertreatment systems use a plurality of nitrogen oxide sensors to capture data for dosing urea. For example, current aftertreatment systems may have one sensor placed before the aftertreatment component and another sensor placed behind the aftertreatment component.

SUMMARY

Various embodiments provide for a system comprising an aftertreatment system, a sensor, a conduit, and a switching device. The aftertreatment component is configured to treat exhaust exiting an engine. The sensor is configured to detect nitrogen oxide in the exhaust, wherein the sensor is positioned downstream of the aftertreatment component. The conduit has a first end positioned upstream of the aftertreatment component and a second end communicable with the sensor positioned downstream of the aftertreatment component. The conduit is configured to receive a sample of the exhaust flowing from upstream of the aftertreatment component through the first end. The conduit is also configured to deliver the sample of the exhaust to the sensor through the second end. The switching device is connected to the conduit and configurable to selectively prevent the flow of exhaust upstream of the aftertreatment component from reaching the sensor. The sensor is configured to selectively detect nitrogen oxide in the exhaust upstream of the aftertreatment component and downstream of the aftertreatment component depending upon a position of the switching device.

Further embodiments provide for an engine system comprising an engine, a selective catalytic reduction catalyst, a sensor, a sample conduit, a switching device, and a controller. The engine operates to produce exhaust and the selective catalytic reduction catalyst treats exhaust exiting the engine. The sensor, positioned downstream of the selective catalytic reduction catalyst, is configured to detect nitrogen oxide in the exhaust. The sample conduit has a first end positioned upstream of the selective catalytic reduction catalyst and a second end communicable with the sensor positioned downstream of the selective catalytic reduction catalyst. The sample conduit is configured to receive a sample of the exhaust that flows from upstream of the selective catalytic reduction catalyst through the first end and deliver the sample of exhaust to the sensor through the second end. The switching device is connected to the sample conduit and configurable to periodically prevent the flow of exhaust upstream of the selective catalytic reduction catalyst from reaching the sensor. The controller communicates with the sensor. The sensor communicates a first signal indicating engine out nitrogen oxide to the controller. The sensor also communicates a second signal indicating selective catalytic reduction catalyst out nitrogen oxide to the controller.

Further embodiments provide for a system comprising a selective catalytic reduction catalyst configured to treat exhaust exiting an engine, a nitrogen oxide sensor, a conduit, a gas sample switching device, and a controller. The nitrogen oxide sensor, positioned downstream of the selective catalytic reduction catalyst, is configured to detect nitrogen oxide in the exhaust. The conduit has a first end positioned upstream of the selective catalytic reduction catalyst and a second end communicable with the nitrogen oxide sensor positioned downstream of the selective catalytic reduction catalyst. The conduit is configured to receive a sample of the exhaust flowing from upstream of the selective catalytic reduction catalyst through the first end. The conduit is also configured to deliver the sample of the exhaust to the nitrogen oxide sensor through the second end. The gas sample switching device is connected to the conduit and configurable to prevent the flow of exhaust upstream of the selective catalytic reduction catalyst from reaching the nitrogen oxide sensor. The controller communicates with the nitrogen oxide sensor. The nitrogen oxide sensor detects nitrogen oxide in the exhaust upstream of the selective catalytic reduction catalyst and downstream of the selective catalytic reduction catalyst depending upon a position of the gas sample switching device. The nitrogen oxide sensor detects nitrogen oxide in the exhaust upstream of the selective catalytic reduction catalyst through the conduit when the gas sample switching device is configured to allow the flow of exhaust upstream of the selective catalytic reduction catalyst to flow through the conduit to reach the nitrogen oxide sensor.

Other embodiments provide for a system comprising an aftertreatment component configured to treat exhaust from an engine and a nitrogen oxide sensor. The nitrogen oxide sensor is configured to receive a first sample of exhaust from upstream of the aftertreatment component. The nitrogen oxide sensor is also configured to receive a second sample of exhaust from downstream of the aftertreatment component. The nitrogen oxide sensor is configured to separately detect nitrogen oxide in the first sample of exhaust and in the second sample of exhaust.

BRIEF DESCRIPTION OF THE DRAWINGS

The details of one or more implementations of the subject matter described in this specification are set forth in the accompanying drawings and the description below. Other features and aspects of the subject matter will become apparent from the description, the drawings, and the claims presented herein.

DETAILED DESCRIPTION OF VARIOUS EMBODIMENTS

Figure 1:
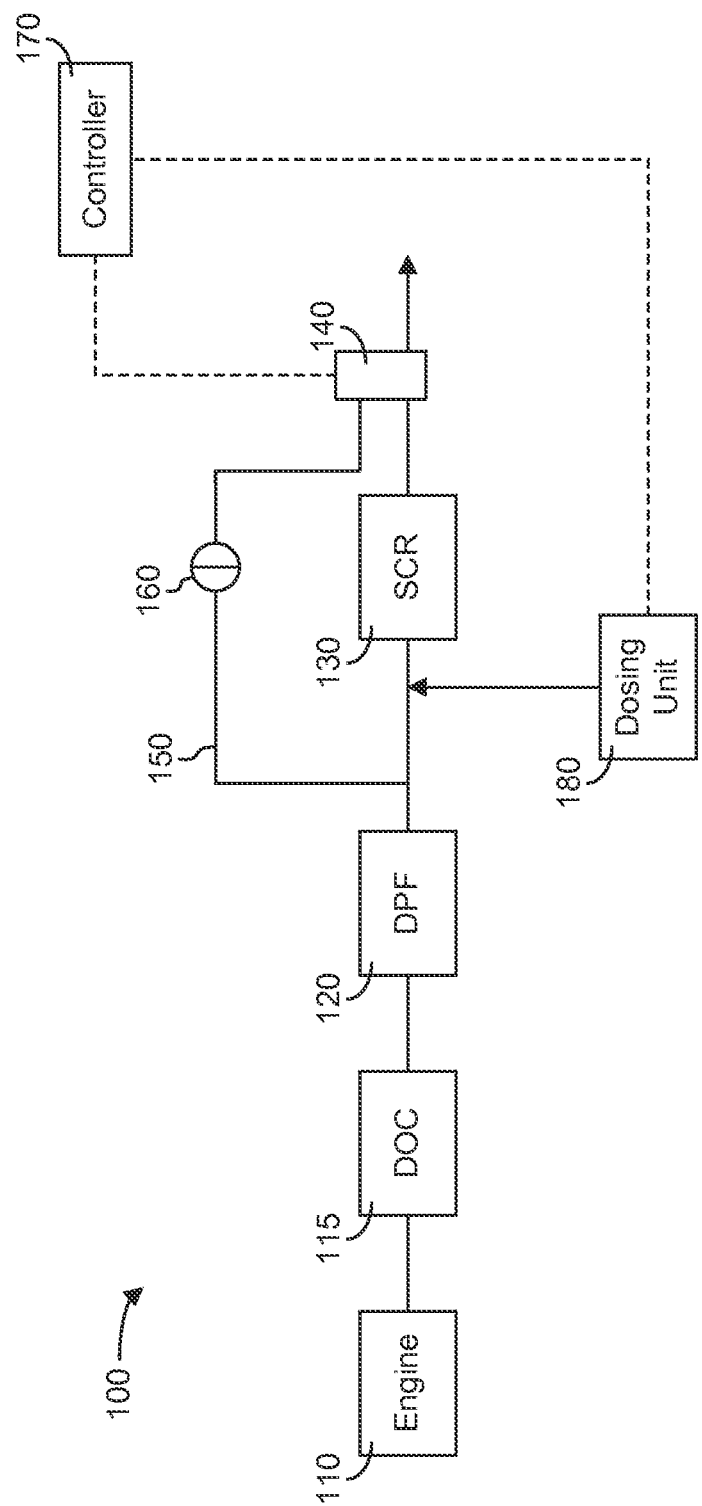
FIG. 1 is a schematic view of an engine system including a signal multiplexing system, according to an example embodiment.

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended, any alterations and further modifications in the illustrated embodiments, and any further applications of the principles of the disclosure as illustrated therein as would normally occur to one skilled in the art to which the disclosure relates are contemplated herein.

The systems and methods described herein relate to a nitrogen oxide signal multiplexing system for use in an aftertreatment system. The multiplexing system uses a single sensor to capture and send nitrogen oxide signal data to a controller. The sensor is positioned downstream of an aftertreatment component (e.g., a selective catalytic reduction catalyst) to detect nitrogen oxide in the exhaust flow exiting the aftertreatment component. The sensor receives a sample of exhaust from upstream of the aftertreatment component through a conduit or conduit (e.g., a pipe structure) positioned in front of the aftertreatment component at one end and connected to the sensor at another end. A sample of exhaust ahead of the aftertreatment component enters into the conduit and is routed toward the sensor. The conduit has a device (e.g., a gas sample switching device) that operates to allow or restrict the flow of exhaust through the conduit. The device allows the single sensor to measure nitrogen oxide both before the aftertreatment component and after the aftertreatment component. The multiplexing system reduces the need for a plurality of sensors/sensor devices, which reduces the cost of aftertreatment systems. The single nitrogen oxide sensor provides two signals for true closed loop control of the aftertreatment component using only one physical sensor.

Referring to FIG. 1, a schematic view of an engine system 100 including a signal multiplexing system is shown, according to an example embodiment. The system 100 includes an engine 110, a diesel particulate filter 120, a selective catalytic reduction catalyst 130, a nitrogen oxide sensor 140, a line 150, a device 160, and a controller 170. In some embodiments, the system also includes a dosing unit 180. In some embodiments, the system 100 further includes a diesel oxidation catalyst 115. In one embodiment, the system 100 is provided on a vehicle powered by the engine 110. In other embodiments, the system 100 may be provided on an engine 110 utilized in other applications such power generation, pumping systems, or any other application which receives or uses power from the engine 110.

The engine 110 can be a diesel engine or any suitable engine for which exhaust treatment is provided. The engine 110 creates exhaust from combustions occurring within the engine cylinders when the engine 110 is operating. The engine 110 can include one or more engine cylinders that receive fuel and air through an intake system (not shown) to create a combustion. In some embodiments, an intake system includes a turbocharger that receives pressured air from the atmosphere and transfers the air to an intake manifold connected to the engine cylinders. The energy released by combustion within the engine cylinders is used to propel, for example, a vehicle hosting the engine 110. The exhaust resulting from the combustion may exit the engine through an exhaust manifold (not shown).

The exhaust passes through several components before entering the atmosphere. Still referring to FIG. 1, the exhaust may exit the engine 110 and flow into the diesel oxidation catalyst 115. The diesel oxidation catalyst 115 is an aftertreatment for exhaust that oxidizes elements found within the exhaust. For example, the diesel oxidation catalyst 115 oxidizes hydrocarbons and carbon monoxide into carbon dioxide and water. The exhaust may also pass through the diesel particulate filter 120, which filters out particulate matter and soot from the exhaust.

Upon exiting the diesel particulate filter 120, the exhaust flows into the selective catalytic reduction catalyst 130 as shown in FIG. 1. According to one implementation, the selective catalytic reduction catalyst 130 is used to convert nitrogen oxides into less harmful substances such as nitrogen and water. To facilitate the conversion, the selective catalytic reduction catalyst 130 uses a reductant such as urea to reduce the nitrogen oxides into diatomic nitrogen and water, for example.

According to the embodiment depicted in FIG. 1, the reductant is injected or otherwise inserted into the exhaust stream upstream of the selective catalytic reduction catalyst 130 by an injector in a dosing unit 180. The reductant, in the form of diesel exhaust fluid, may comprise a urea based solution that mixes with the exhaust to chemically decompose into ammonia. One specific example of diesel exhaust fluid comprises a solution of 32.5% high purity urea and 67.5% deionized water. It shall be appreciated, however, that other diesel exhaust fluid solutions and reductants may also be utilized.

The dosing unit 180 includes an injector configured to inject the diesel exhaust fluid into the exhaust flow. In some embodiments, the dosing unit 180 can be mounted on a portion of the exhaust system upstream of the selective catalytic reduction catalyst 130. For example, the dosing unit 180 may be mounted such that the injector is configured to inject diesel exhaust fluid near an inlet portion (e.g., a receiving end) of the selective catalytic reduction catalyst 130. The injector can have an outlet portion (a nozzle in a particular embodiment) arranged to spray or otherwise insert aqueous reductant droplets into the exhaust.

The dosing unit 180 may retrieve diesel exhaust fluid from a storage tank (not shown). In some embodiments, the dosing unit 180 includes various structures to facilitate transfer of the diesel exhaust fluid from the storage tank to the dosing unit 180 and the delivery of the diesel exhaust fluid to parts of an exhaust system (e.g., the selective catalytic reduction catalyst 130). For example, the dosing unit 180 can include a pump, a filter screen, and a check valve upstream of the pump to receive diesel exhaust fluid from the storage tank. In one form, the pump is a diaphragm pump, though it shall be appreciated that any other type of pump may be utilized. The pump can output pressurized diesel exhaust fluid at a predetermined pressure, which can flow through a second check valve, a pulsation dampener, and a second filter to provide pressurized reductant to a metering valve. In some embodiments, the dosing unit 180 can further include a bypass line around the pump having a bypass valve operable to open/close and to permit or prevent the flow of diesel exhaust fluid through the bypass line to a location upstream of the first filter screen. In one embodiment, the diesel exhaust fluid is returned to the storage tank, for example, during a purging operation.

In some embodiments, the dosing unit 180 uses air-assisted technology to inject reductant into the exhaust flow. In other embodiments, the dosing unit 180 can be of an airless configuration, in that the injector can discharge the diesel exhaust fluid without a combined flow of pressurized air. The storage tank can hold a supply of diesel exhaust fluid and can be vented to allow the reductant to be withdrawn at a port in the storage tank. A conduit can extend from the port to the dosing unit 180 to allow the dosing unit 180 to be in fluid communication with the storage tank. The dosing unit 180 may also be in fluid communication with the injector. When the dosing unit 180 operates, it can draw reductant from the storage tank through the conduit, and can pump the reductant to the injector. A backflow conduit (not shown) may be provided to return excess reductant to the storage tank. The dosing unit 180 can be controlled through the controller 170.

The dosing unit 180, along with other components (for example, the nitrogen oxide sensor 140) are electrically or communicatively coupled to a controller 170. The controller 170 is configured to control the dosing unit 180 to dose reductant into the aftertreatment component (e.g., selective catalytic reduction catalyst 130). In some embodiments, the controller 170 is configured to control and/or communicate with the nitrogen oxide sensor 140. The controller 170 is configured to receive data detected by the nitrogen oxide sensor 140 regarding the amount of nitrogen oxide detected in the exhaust flow. The controller 170 may include a microprocessor, an application-specific integrated circuit (ASIC), a field-programmable gate array (FPGA), etc., or combinations thereof. The controller 170 may include memory which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory (EEPROM), erasable programmable read only memory (EPROM), flash memory, or any other suitable memory from which the controller 170 can read instructions. The instructions may include code from any suitable programming language. The controller 170 could be a stand-alone unit, or it could be integrated into another controller or control module, such as an engine control module (ECM) of an associated engine.

In one implementation, the nitrogen oxide sensor 140 is located downstream of the selective catalytic reduction catalyst 130 to detect nitrogen oxide emissions in the exhaust flow after the selective catalytic reduction catalyst 130. By way of the conduit 150 mechanism described below, the nitrogen oxide sensor 140 also is configured to detect nitrogen oxide emission in the exhaust flow before the selective catalytic reduction catalyst 130. The nitrogen oxide sensor 140 provides feedback data to a controller 170 that is used to modify an operating parameter (e.g., the injection amount of urea) of the aftertreatment system. For example, the nitrogen oxide sensor 140 may be utilized to detect the amount of nitrogen oxide exiting the vehicle exhaust system and, if the nitrogen oxide detected is too high or too low (e.g., outside of a predetermined range or particular value), the controller 170 may modify an amount of reductant delivered by the dosing unit 180.

While the signal multiplexing system is shown in FIG. 1 utilizing a nitrogen oxide sensor 140, it is understood that the signal multiplexing system can be used with any type of emissions sensor to reduce the sensor count. For example, a carbon monoxide sensor, and/or a particulate matter sensor may be utilized in the multiplexing systems disclosed herein. Thus, a carbon monoxide sensor, and/or a particulate matter sensor can be positioned downstream of the selective catalytic reduction catalyst 130 to detect carbon monoxide, and/or particulate matter within the exhaust gas exiting the exhaust of the vehicle. Similarly, a line or conduit 150 may be utilized to collect exhaust sample from upstream of the selective catalytic reduction catalyst 130 and send the exhaust sample to the carbon monoxide sensor, and/or a particulate matter sensor.

According to one implementation, the conduit 150 is configured to carry a small sample of exhaust from upstream of the selective catalytic reduction catalyst 130 to the nitrogen oxide sensor 140. The conduit 150 provides a conduit through which pre-selective catalytic reduction catalyst 130 exhaust gas traverses to be analyzed by a sensor for the presence of nitrogen oxide. The conduit 150 may be made of a variety of material including any material suitable to withstand environment within an engine, such as metal, plastics, etc. The conduit 150 includes a first end and a second end. The first end is positioned upstream of the selective catalytic reduction catalyst 130. In one implementation, the first end of the conduit 150 is also positioned upstream of the place in which the dosing unit 180 injects the diesel exhaust fluid into the exhaust stream. While the first end of the conduit 150 is shown in FIG. 1 positioned downstream of the diesel particulate filter 120, it is understood that the first end of the conduit 150 may be positioned any place both upstream of the selective catalytic reduction catalyst 130 and downstream of the engine 100. For example, the first end of the conduit 150 can be positioned upstream of the diesel particulate filter 120 and/or the diesel oxidation catalyst 115. The second end may connect directly or indirectly to the nitrogen oxide sensor 140. The second end provides an opening through which exhaust exits the conduit 150 to interact with the nitrogen oxide sensor 140.

Referring still to FIG. 1, the device 160 is configured to allow a single sensor (e.g., nitrogen oxide sensor 140) to measure nitrogen oxide content in exhaust upstream of the selective catalytic reduction catalyst 130 and in exhaust downstream of the selective catalytic reduction catalyst 130. In one implementation, the device 160 is a device that turns the flow of exhaust through the conduit 150 "on and off" by allowing exhaust to flow into and out of the conduit 150 (on) and preventing the exhaust from flowing into and out of the conduit 150 (off). Thus, the device 160 is an on position when the device 160 is configured to allow a flow of exhaust. In some implementations, the on position is referred to as an open position. Similarly, the device 160 is in an off position when the device 160 is configured to prevent or block the flow of exhaust. In some implementations, the off position is referred to as a closed position. The device 160 is communicatively coupled to the conduit 150. In one embodiment, the device 160 is directly coupled to the conduit 150. In another embodiment, the device 160 is indirectly coupled to the conduit 150. In yet another embodiment, the device is positioned within the conduit 150.

According to another embodiment, the device 160 is a switching device. For example, in one implementation the device 160 (e.g., switching device) is an electric solenoid valve. In another embodiment, the device 160 is a mechanical valve (e.g., purely and/or partially mechanical valve). In yet another embodiment, the device 160 is a pneumatic valve. An embodiment of a pneumatic valve is further described below with reference to FIG. 3. A further embodiment of the device 160 includes a fluid oscillator. In some embodiments, the device 160 is powered by fluid pressure. In an example embodiment where the device 160 is powered by fluid pressure, the device 160 is not wired to a controller 170 within a control system. Instead, the pressure of the fluid will control and regulate when a device 160 powered by fluid pressure opens to allow exhaust to flow through the conduit 150 and closes to prevent exhaust from flowing through the conduit 150.

Figure 2:
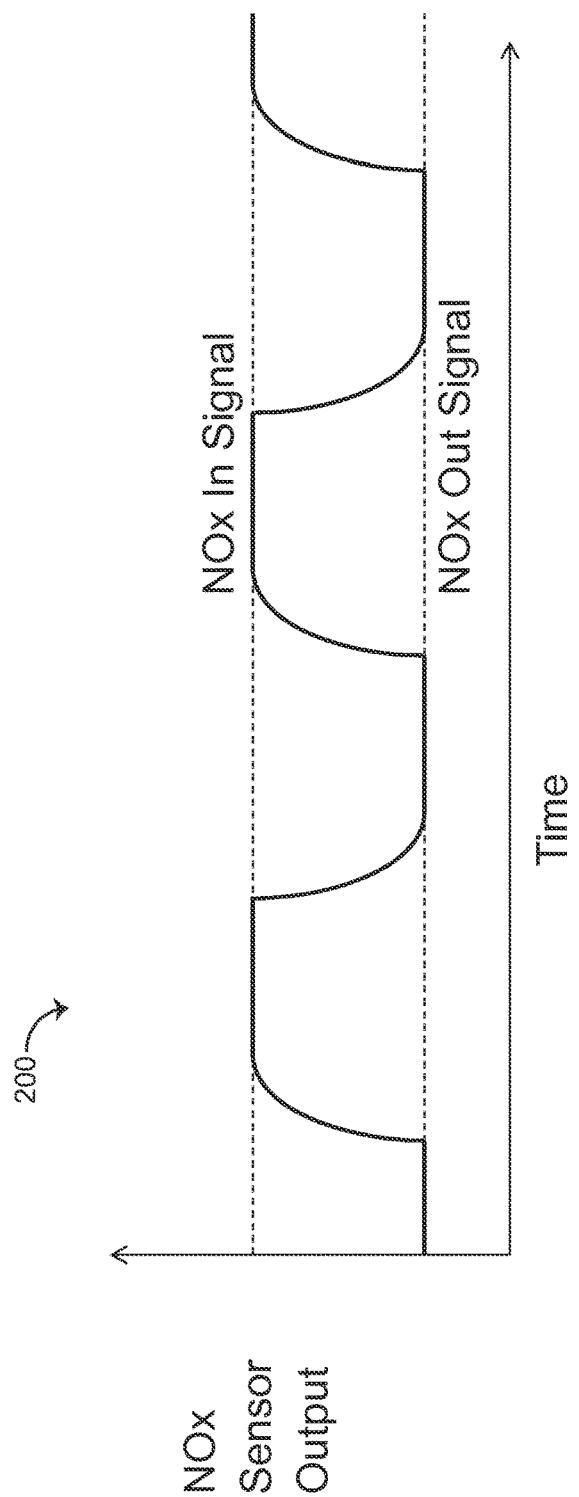
FIG. 2 is a schematic display of a graph of a sample sensor output in the multiplexing system over time.

FIG. 2 is a schematic display of a graph of a sample nitrogen oxide sensor 140 output in the multiplexing system over time. The nitrogen oxide-out signal denotes a detection of nitrogen oxide by the nitrogen oxide sensor 140 in exhaust that exits out of the selective catalytic reduction catalyst 130 downstream of the selective catalytic reduction catalyst 130. The nitrogen oxide-in signal denotes nitrogen oxide detected in exhaust that enters into the selective catalytic reduction catalyst 130 upstream of the selective catalytic reduction catalyst 130. The nitrogen oxide-in signal in FIG. 2 is shown higher than the nitrogen oxide-out signal. Thus, the amount of nitrogen oxide in the exhaust entering into the selective catalytic reduction catalyst 130 is greater than the amount of nitrogen oxide in the exhaust exiting the selective catalytic reduction catalyst 130. The nitrogen oxide sensor 140 output switches between outputting the nitrogen oxide-out signal and the nitrogen oxide-in signal as time elapses on the graph of FIG. 2.

The nitrogen oxide sensor 140 outputs the nitrogen oxide-out signal when the device 160 (e.g., switching device) is configured to prevent exhaust upstream of the selective catalytic reduction catalyst 130 from flowing through the conduit 150. In such case, the switching device, for example, is in an "off" position according to one embodiment. The nitrogen oxide sensor 140 outputs the nitrogen oxide-in signal when the switching device is configured to allow exhaust upstream of the selective catalytic reduction catalyst 130 to flow through the conduit 150 and interact with the nitrogen oxide sensor 140. In such a case, the switching device is configured in an "on" position.

As shown in FIG. 2, the device 160 switches positions to allow and prevent the flow of exhaust through the conduit 150 periodically (e.g., in time intervals). In one example, the device 160 switches on and off every 5 seconds. However, it is understood that any time interval may be used, and time intervals of different durations may be used. For example, the device 160 may be configured to switch from an on position to an off position every 5 seconds, and the device 160 may be configured to switch from the off position to the on position every 10 seconds. Also shown in FIG. 2, the device 160 does not change positions (e.g., from on to off or from off to on) to prevent or allow the flow of exhaust through the conduit 150 before the nitrogen oxide sensor 140 registers and outputs the set nitrogen oxide-in signal or the nitrogen oxide-out signal. Thus, the frequency at which the device 160 switches such that the flow through the conduit 150 is on or off is slower than the nitrogen oxide sensor 140 response time. The nitrogen oxide sensor 140 response time is indicated by the curved portions spanning between the nitrogen oxide-out signal and nitrogen oxide-in signal on the graph of FIG. 2. This time may vary due to a variety of factors, such as the distance between the two signals on the graph. The greater the distance between the two signals, the longer the response time for the nitrogen oxide sensor 140. The smaller the distance between the two signals, the shorter the response time for the nitrogen oxide sensor 140.

Figure 3:
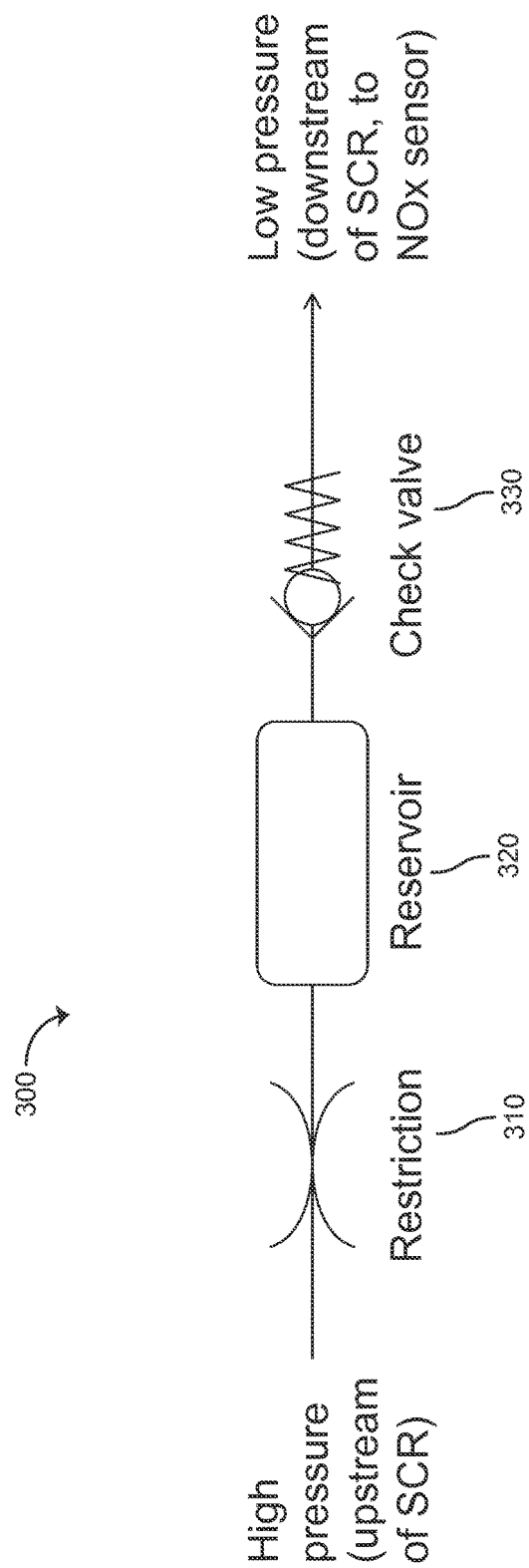
FIG. 3 is a schematic diagram of a pneumatic device used in the multiplexing system, according to an example embodiment.

Referring to FIG. 3, a schematic diagram of a pneumatic device 300 (e.g., a pneumatic valve) used in the multiplexing system is shown, according to an example embodiment. The pneumatic device 300 is a device configured to turn the flow of exhaust through the device on and off periodically. The pneumatic device 300 is positioned between a high pressure end and a low pressure end. The high pressure end is upstream of the selective catalytic reduction catalyst 130. The low pressure end is downstream of the selective catalytic reduction catalyst 130. The pneumatic device 300 includes a restriction 310, a reservoir 320, and a check valve 330. The restriction 310 is positioned at the high pressure end, upstream of the selective catalytic reduction catalyst 130. The check valve 330 is positioned at the low pressure end, downstream of the selective catalytic reduction catalyst 130 and to the nitrogen oxide sensor 140. The check valve 330 is configured to open at one pressure and close at another pressure. In one embodiment, the check valve 330 has a detent such that the check valve 330 opens and closes at different pressures. According to one embodiment, a different pressure is required to pop open the check valve 330 than is required to hold the check valve 330 open. In one implementation, less pressure is required to hold the check valve 330 open than is required to open the check valve 330.

The reservoir 320 is positioned between the restriction 310 and the check valve 330 and is configured to hold an amount of pressure. In some implementations, the restriction 310 allows a small steady flow of exhaust into the reservoir 320. The reservoir 320 receives the flow of exhaust allowed in by the restriction 310. Once the reservoir 320 reaches a particular high pressure (e.g., the high pressure upstream of the restriction 310), the check valve 330 opens. The exhaust flows out of the reservoir 320 until the pressure in the reservoir 320 drops enough for the check valve 330 to close. Once the check valve 330 closes, the cycle repeats with the restriction 310 allowing a small amount of exhaust to enter into the reservoir 320 until the reservoir 320 reaches a pressure high enough to open the check valve 330. Accordingly, the pneumatic device 300 provides an intermittent flow of exhaust exiting the check valve 330 downstream of the selective catalytic reduction catalyst 130 to the nitrogen oxide sensor 140. The period of the cycle described above can be determined by choosing particular parameters for the restriction 310, reservoir 320, and the check valve 330. Similarly, the period of the cycle described above may be altered by altering the parameters for one or more of the restriction 310, reservoir 320, and check valve 330. For example, the period of the cycle will increase with a larger reservoir 320 because a larger sized reservoir 320 will take a longer time to fill up and reach a predetermined pressure.

Figure 4:
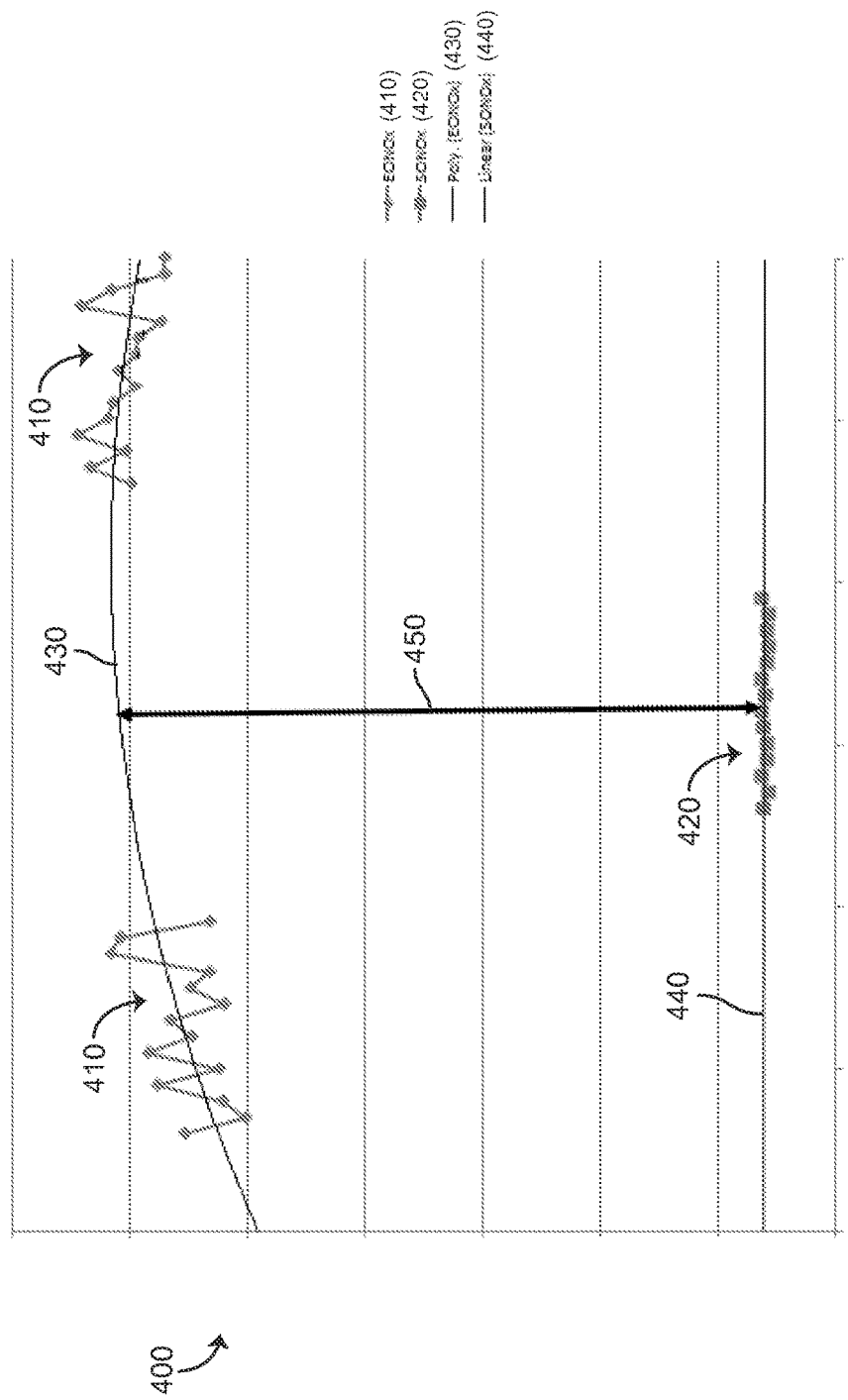
FIG. 4 is a graphical comparison of the engine-out nitrogen oxide data points and the aftertreatment component-out nitrogen oxide data points as detected by a single sensor in the multiplexing system.

FIG. 4 is a graphical comparison of engine-out nitrogen oxide data points 410 and the aftertreatment component-out nitrogen oxide data points 420 as detected by a single sensor in the multiplexing system. The engine-out nitrogen oxide data points 410 represent signal values detected by the nitrogen oxide sensor 140 that describe the amount of nitrogen oxide detected in exhaust downstream of the engine 110 and upstream of an aftertreatment component (i.e., the selective catalytic reduction catalyst 130). The aftertreatment component-out nitrogen oxide data points 420 represent signal values detected by the nitrogen oxide sensor 140 that describe the amount of nitrogen oxide detected in exhaust downstream of the selective catalytic reduction catalyst 130. The graph 400 shows a comparison of the engine-out nitrogen oxide data points 410 with the aftertreatment component-out nitrogen oxide data points 420. Shown on the graph 400, a first curve 430 is fit to the engine-out nitrogen oxide data points 410. A second curve 440 is fit to the aftertreatment component-out nitrogen oxide data points 420. Next, the engine-out nitrogen oxide data points 410 and the aftertreatment component-out nitrogen oxide data points 420 are compared at the same point in time as shown by example comparison line 450. In one implementation, the engine-out nitrogen oxide data points 410 and the aftertreatment component-out nitrogen oxide data points 420 are compared at the same point in time by comparing the points on the first fit curve 430 with the points on the second fit curve 440. It is understood that a variety of comparison and regression methods may be used to analyze the engine-out nitrogen oxide data points 410 and aftertreatment component-out nitrogen oxide data points 420 captured by the single nitrogen oxide sensor 140.

Figure 5:
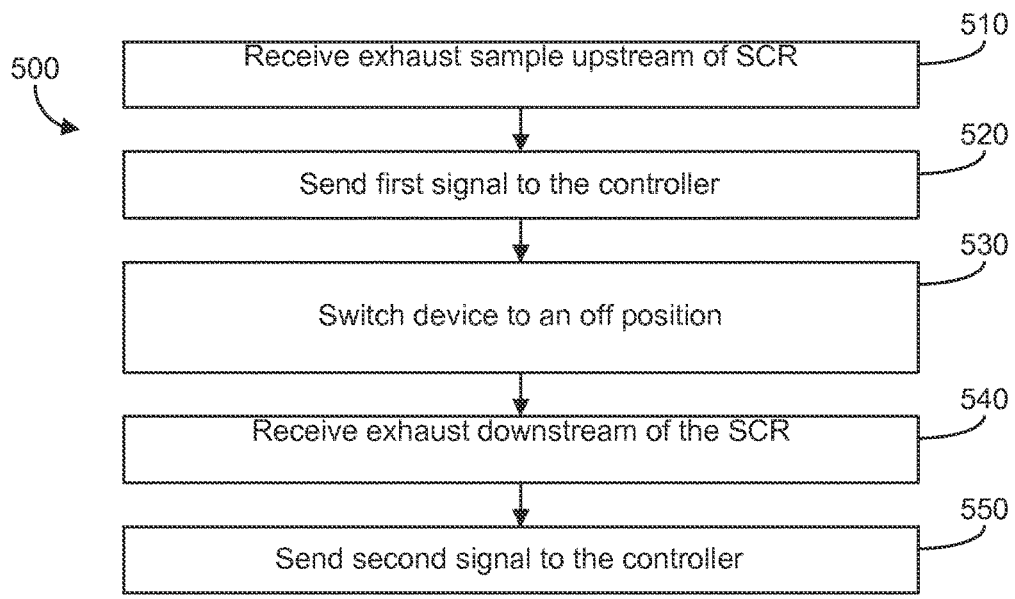
FIG. 5 is a schematic flow diagram of a process for operating the signal multiplex system to send signals according to an example embodiment.

Referring to FIG. 5, a schematic flow diagram of a process 500 for operating the signal multiplex system to send signals is shown. At 510, the nitrogen oxide sensor 140 receives exhaust sample upstream of the selective catalytic reduction catalyst 130 (SCR). As discussed above, the conduit 150 receives and directs a small sample of exhaust upstream of the selective catalytic reduction catalyst 130 to the nitrogen oxide sensor 140. At 520, the nitrogen oxide sensor 140 sends a first signal to the controller 170. The first signal contains the amount of nitrogen oxide in the sample of exhaust upstream of the selective catalytic reduction catalyst 130. Once the first signal is detected by the nitrogen oxide sensor 140 and/or sent to the controller 170, the device 160 switches off. At 530, the device 160 switches to an off position, which prevents exhaust upstream of the selective catalytic reduction catalyst 130 from traveling through the conduit 150 and toward the nitrogen oxide sensor 140. At 540, the nitrogen oxide sensor 140 receives exhaust downstream of the selective catalytic reduction catalyst 130. Once the nitrogen oxide sensor 140 receives the exhaust downstream of the selective catalytic reduction catalyst 130, the nitrogen oxide sensor 140 creates a second signal that indicates the amount of nitrogen oxide detected in the exhaust downstream of the selective catalytic reduction catalyst 130. At 550, the nitrogen oxide sensor 140 sends the second signal to the controller 170. According to one implementation, the process 500 repeats by beginning back at 510 upon the completion of 550.

Figure 6:
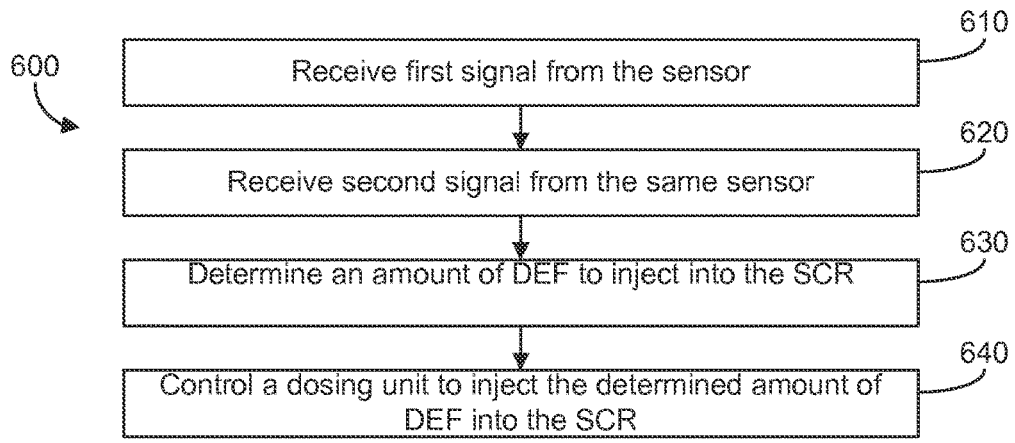
FIG. 6 is a schematic flow diagram of an example process for controlling a dosing unit using signals received from the signal multiplexing system shown in FIG. 1.

FIG. 6 is a block diagram of an example process 600 for controlling a dosing unit 180 using signals received from the signal multiplexing system shown in FIG. 1. At 610, the controller 170 receives a first signal from the nitrogen oxide sensor 140. As described above, the first signal represents the amount of nitrogen oxide detected in a sample of exhaust upstream of the selective catalytic reduction catalyst 130. At 620, the controller 170 receives a second signal from the same nitrogen oxide sensor 140. The second signal indicates the amount of nitrogen oxide detected in the exhaust downstream of the selective catalytic reduction catalyst 130. In some embodiments, where the selective catalytic reduction catalyst 130 reduces nitrogen oxide, the second signal will indicate a lower amount of nitrogen oxide than the first signal. At 630, the controller 170 determines an amount of diesel exhaust fluid (DEF) to inject into the selective catalytic reduction catalyst 130 (SCR). In one implementation, the controller 170 determines the injection amount of diesel exhaust fluid based upon the values of nitrogen oxide detected in the first signal and/or in the second signal. At 640, the controller 170 controls a dosing unit 180 by directing the dosing unit 180 to inject the amount of diesel exhaust fluid determined at 630 into the exhaust entering the selective catalytic reduction catalyst 130. According to one implementation, the process 600 repeats by beginning back at 610 upon the completion of 640.

Figure 7:
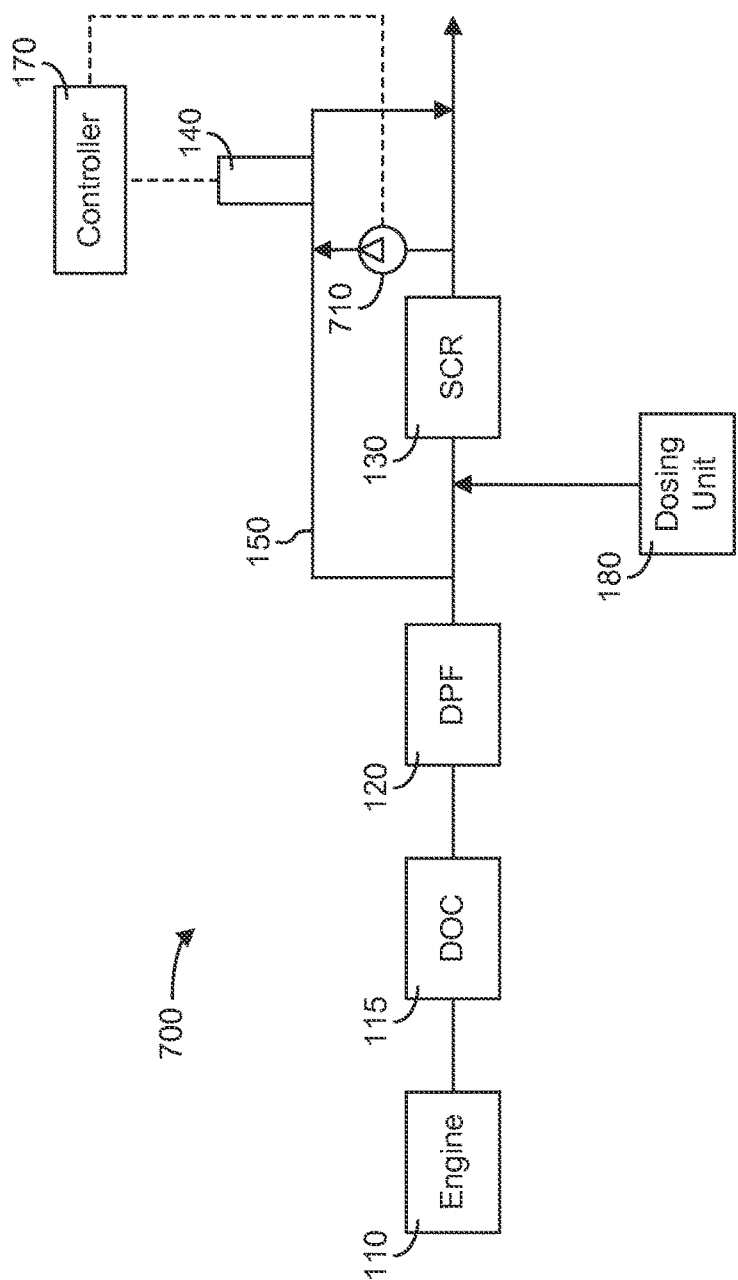
FIG. 7 is a schematic view of an example engine system including a signal multiplexing system utilizing a pump, according to an example embodiment.

Referring to FIG. 7, a schematic view of an example engine system 700 including a signal multiplexing system utilizing a pump 710 is shown according to an alternative embodiment. A pump 710 is used to retrieve a sample of exhaust from downstream of the selective catalytic reduction catalyst 130 and transfer the sample towards the nitrogen oxide sensor 140. In some embodiments, the pump 170 is connected, either directly or indirectly, to the conduit 150 so as to transfer the sample from downstream of the selective catalytic reduction catalyst 130 through the conduit 150 and to the nitrogen oxide sensor 140. The conduit 150 has a first end positioned upstream of the selective catalytic reduction catalyst 130 to receive a sample of exhaust from upstream of the selective catalytic reduction catalyst 130. The conduit 150 is also communicable with the nitrogen oxide sensor 14 (e.g., by way of a second end communicable with the nitrogen oxide sensor 140). In this implementation, the exhaust from upstream of the selective catalytic reduction catalyst 130 is prevented from traveling through the conduit 150 to reach the nitrogen oxide sensor 140 when the pump 170 transfers the exhaust from downstream of the selective catalytic reduction catalyst 130 towards the nitrogen oxide sensor 140. In one example, the pump 710 prevents exhaust from upstream of the selective catalytic reduction catalyst 130 from traveling through the conduit 150 by injecting a flow exhaust from downstream of the selective catalytic reduction catalyst 130 into the conduit 150 at a force greater than the force of the upstream exhaust in the conduit 150. In another example, a block mechanism or a valve may be used to prevent exhaust from traveling through the conduit when the pump 710 is in operation. The controller 170 is configured to communicate with and control the pump 710. In some embodiments, the controller 170 controls the pump 710 based on a signal received from the nitrogen oxide sensor 140.

Figure 8:
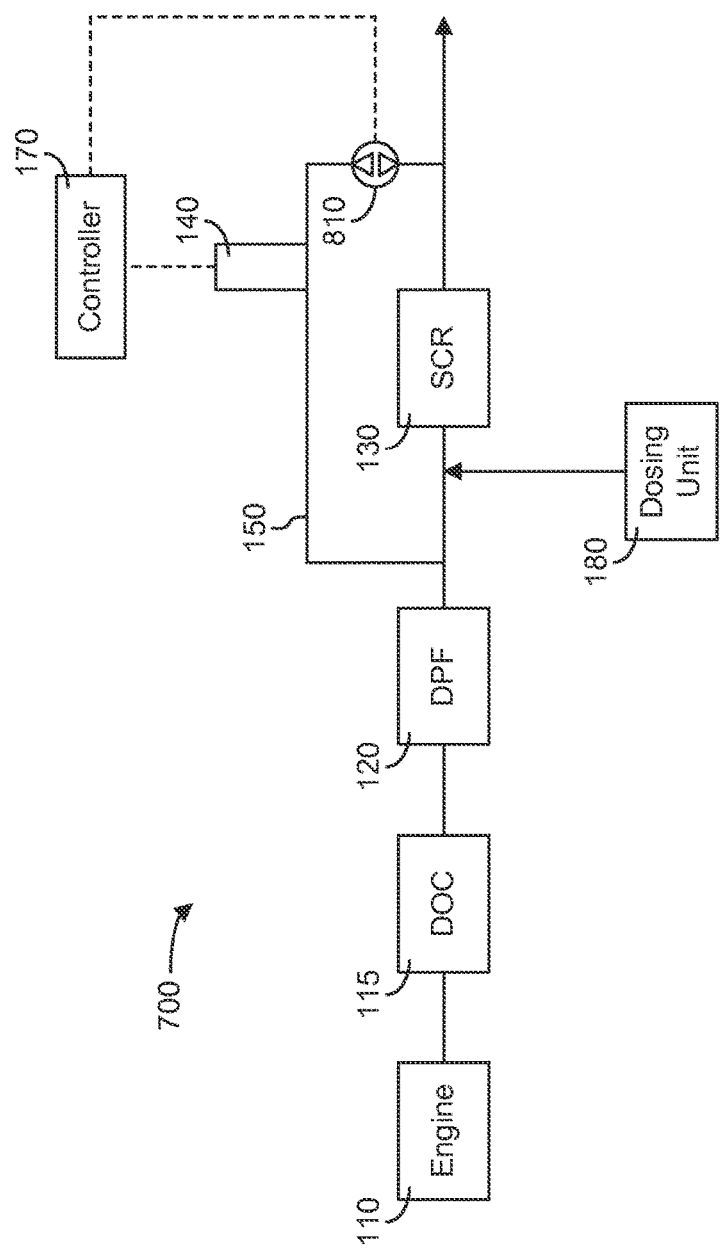
FIG. 8 is a schematic view of an example engine system including a signal multiplexing system utilizing a dual direction pump, according to an example embodiment.

In another implementation, the pump 710 retrieves a sample of exhaust from upstream of the selective catalytic reduction catalyst 130 and transfers the sample towards the nitrogen oxide sensor 140. The pump 170 is connected, either directly or indirectly, to the conduit 150 so as to transfer the sample from upstream of the selective catalytic reduction catalyst 130 through the conduit 150 and towards the nitrogen oxide sensor 140. The conduit 150 has a first end positioned downstream of the selective catalytic reduction catalyst 130 to receive a sample of exhaust from downstream of the selective catalytic reduction catalyst 130. The conduit 150 also has a second end communicable with the nitrogen oxide sensor 140. In this implementation, the exhaust from downstream of the selective catalytic reduction catalyst 130 is prevented from traveling through the conduit 150 to reach the nitrogen oxide sensor 140 when the pump 170 is operating to transfer the exhaust from downstream of the selective catalytic reduction catalyst 130 towards the nitrogen oxide sensor 140. While this example provides for the use of a pump 170, it is understood that a variety of mechanisms and structures may be used to facilitate the detection of nitrogen oxide in a sample of exhaust both pre-selective catalytic reduction catalyst 130 and post-selective catalytic reduction catalyst 130 by a single nitrogen oxide sensor 140. For example, in FIG. 8, a dual direction pump 810 is configured to pump in different directions to sample exhaust in different positions within the system 700. In one implementation, the dual direction pump 810 pumps forward to sample pre-selective catalytic reduction catalyst 130 exhaust by forcing exhaust upstream of the selective catalytic reduction catalyst 130 through the conduit 150 toward the nitrogen oxide sensor 140. The dual direction pump 810 also pumps backwards to sample post-selective catalytic reduction catalyst 130 exhaust by forcing exhaust downstream of the selective catalytic reduction catalyst 130 through the conduit 150 toward the nitrogen oxide sensor 140. Additionally, a varying of the position of the nitrogen oxide sensor 140 (i.e., upstream of the selective catalytic reduction catalyst 130, downstream of the selective catalytic reduction catalyst 130, in-stream of the exhaust flow, out-stream of the exhaust flow, etc.) may also be utilized.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the disclosure's operating conditions and arrangement of the embodiments without departing from the scope of the present invention.

As used herein, the term "controller" encompasses all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as distributed computing and grid computing infrastructures. A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code).

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, the separation of various system components in the implementations described above should not be understood as requiring such separation in all implementations, and it should be understood that the described components and systems can generally be integrated in a single product or packaged into multiple products embodied on tangible media.

The terms "coupled," "connected," and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

The terms "fluidly coupled," "in fluid communication," and the like as used herein mean the two components or objects have a pathway formed between the two components or objects in which a fluid, such as water, air, gaseous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various exemplary implementations is illustrative only and not restrictive in character. All changes and modifications that come within the spirit and/or scope of the described implementations are desired to be protected. It should be understood that some features may not be necessary and implementations lacking the various features may be contemplated as within the scope of the application, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system, comprising:
an aftertreatment component configured to treat exhaust exiting an engine;
a sensor configured to detect nitrogen oxide in the exhaust, the sensor positioned downstream of the aftertreatment component;
a dosing unit configured to inject reductant near an inlet portion of the aftertreatment component;
a conduit having a first end positioned upstream of the aftertreatment component and upstream of a place at which the dosing unit injects the reductant into the exhaust gas stream, and a second end communicable with the sensor positioned downstream of the aftertreatment component, wherein the conduit is configured to receive a sample of the exhaust flowing from upstream of the aftertreatment component through the first end and deliver the sample of the exhaust to the sensor through the second end; and
a switching device connected to the conduit and configurable to selectively prevent the flow of exhaust upstream of the aftertreatment component from reaching the sensor,
wherein the sensor is configured to selectively detect nitrogen oxide in the exhaust upstream of the aftertreatment component and downstream of the aftertreatment component depending upon a position of the switching device.

2. The system of claim 1, wherein the sensor detects nitrogen oxide in the exhaust upstream of the aftertreatment component when the switching device is positioned in an "on" position so as to allow exhaust to flow through the conduit.

3. The system of claim 1, wherein the sensor detects nitrogen oxide in the exhaust downstream of the aftertreatment component when the switching device is positioned in an "off" position so as to prevent the flow of the exhaust through the conduit.

4. The system of claim 1, wherein the switching device periodically opens to allow the flow of the exhaust through the conduit and periodically closes to prevent the flow of the exhaust through the conduit.

5. The system of claim 1, wherein the aftertreatment component is a selective catalytic reduction catalyst.

6. The system of claim 5, further comprising a controller communicable with the sensor and configured to selectively instruct the dosing unit to insert an amount of the reductant into the exhaust upstream of the selective catalytic reduction catalyst based upon information obtained from the sensor.

7. The system of claim 1, wherein the switching device comprises an electric solenoid valve.

8. The system of claim 1, wherein the switching device comprises a mechanical valve.

9. The system of claim 1, wherein the switching device comprises a pneumatic valve.

10. The system of claim 9, wherein the pneumatic valve comprises a restriction, a reservoir, and a check valve, the restriction allowing the flow of the exhaust into the reservoir, and wherein the check valve opens based on a pressure reached by the reservoir that opens the check valve.

11. The system of claim 1, wherein the switching device comprises a fluidic oscillator.

12. The system of claim 1, wherein the switching device is powered by fluid pressure.

13. An engine system, comprising:
an engine;
a selective catalytic reduction catalyst configured to treat exhaust exiting the engine;
a dosing unit configured to inject reductant near an inlet portion of the selective catalytic reduction catalyst;
a sensor configured to detect nitrogen oxide in the exhaust, the sensor positioned downstream of the selective catalytic reduction catalyst;
a sample conduit having a first end positioned upstream of the selective catalytic reduction catalyst and upstream of a place at which the dosing unit injects the reductant into the exhaust gas stream, and a second end communicable with the sensor positioned downstream of the selective catalytic reduction catalyst, wherein the sample conduit is configured to receive a sample of the exhaust that flows from upstream of the selective catalytic reduction catalyst through the first end and deliver the sample of exhaust to the sensor through the second end;
a switching device connected to the sample conduit and configurable to periodically prevent the flow of exhaust upstream of the selective catalytic reduction catalyst from reaching the sensor; and
a controller communicable with the sensor,
wherein the sensor communicates a first signal indicating engine out nitrogen oxide to the controller, and wherein the sensor communicates a second signal indicating selective catalytic reduction catalyst out nitrogen oxide to the controller.

14. The engine system of claim 13, wherein the switching device is powered by fluid pressure.

15. The engine system of claim 13, wherein the switching device comprises an electric solenoid valve.

16. The engine system of claim 13, wherein the switching device comprises a mechanical valve.

17. The engine system of claim 13, wherein the switching device comprises a pneumatic valve.

18. The engine system of claim 13, wherein the switching device comprises a fluidic oscillator.

19. The engine system of claim 13, wherein the controller determines the amount of the reductant that the dosing unit inserts into the exhaust based upon the first signal and the second signal.

20. A system, comprising:
a selective catalytic reduction catalyst configured to treat exhaust from an engine;
a dosing unit configured to inject reductant near an inlet portion of the selective catalytic reduction catalyst;
a nitrogen oxide sensor configured to detect nitrogen oxide in the exhaust, the nitrogen oxide sensor positioned downstream of the selective catalytic reduction catalyst;
a conduit having a first end positioned upstream of the selective catalytic reduction catalyst and upstream of a place at which the dosing unit injects the reductant into the exhaust gas stream, and a second end communicable with the nitrogen oxide sensor positioned downstream of the selective catalytic reduction catalyst, wherein the conduit is configured to receive a sample of the exhaust flowing from upstream of the selective catalytic reduction catalyst through the first end and deliver the sample of the exhaust to the nitrogen oxide sensor through the second end;

a gas sample switching device connected to the conduit and configurable to selectively prevent the flow of exhaust upstream of the selective catalytic reduction catalyst from reaching the nitrogen oxide sensor; and a controller communicable with the nitrogen oxide sensor, wherein the nitrogen oxide sensor detects nitrogen oxide in the exhaust upstream of the selective catalytic reduction catalyst and downstream of the selective catalytic reduction catalyst depending upon a position of the gas sample switching device, and wherein the nitrogen oxide sensor detects nitrogen oxide in the exhaust upstream of the selective catalytic reduction catalyst through the conduit when the gas sample switching device is configured to allow the flow of exhaust upstream of the selective catalytic reduction catalyst to flow through the conduit to reach the nitrogen oxide sensor.

21. The system of claim 20, wherein the nitrogen oxide sensor is configured to communicate a first signal to the controller, the first signal indicating engine out nitrogen oxide detected upstream of the selective catalytic reduction catalyst.

22. The system of claim 21, wherein the nitrogen oxide sensor is configured to communicate a second signal to the controller, the second signal indicating selective catalytic reduction catalyst out nitrogen oxide detected downstream of the selective catalytic reduction catalyst.

23. The system of claim 22, wherein the controller determines an amount of reductant to insert into the exhaust upstream of the selective catalytic reduction catalyst based upon the first signal and the second signal received from the nitrogen oxide sensor.

24. The system of claim 23, wherein the controller instructs the dosing unit to insert the determined amount of the reductant into the exhaust upstream of the selective catalytic reduction catalyst.

25. The system of claim 24, wherein the switching device comprises a mechanical valve.

26. The system of claim 24, wherein the switching device comprises a pneumatic valve.

27. The system of claim 24, wherein the switching device comprises a fluidic oscillator.

28. A system, comprising:
an aftertreatment component configured to treat exhaust from an engine; and
a dosing unit configured to inject reductant near an inlet portion of the aftertreatment component;
a nitrogen oxide sensor configured to receive a first sample of exhaust from upstream of the aftertreatment component and upstream of a place at which the dosing unit injects the reductant into the exhaust gas stream, and receive a second sample of exhaust from downstream of the aftertreatment component; and
a conduit having a first end and a second end, the first end configured to receive at least one of the first sample of exhaust and the second sample of exhaust, the second end communicable with the nitrogen oxide sensor, and wherein the conduit transfers at least one of the first sample of exhaust and the second sample of exhaust to the nitrogen oxide sensor to detect nitrogen oxide in the received sample,
wherein the nitrogen oxide sensor is configured to separately detect nitrogen oxide in the first sample of exhaust and in the second sample of exhaust.

29. The system of claim 28, further comprising a pump configured to transfer exhaust from one of downstream of the aftertreatment component and upstream of the aftertreatment component towards the nitrogen oxide sensor,
wherein exhaust from upstream of the aftertreatment component is prevented from traveling through the conduit to reach the nitrogen oxide sensor when the pump transfers the exhaust from downstream of the aftertreatment component towards the nitrogen oxide sensor, and wherein exhaust from downstream of the aftertreatment component is prevented from traveling through the conduit to reach the nitrogen oxide sensor when the pump transfers the exhaust from upstream of the aftertreatment component towards the nitrogen oxide sensor.

30. The system of claim 29, wherein the pump is a dual direction pump configured to pump in a forward direction to provide the first sample of exhaust to the nitrogen oxide sensor and pump backwards to provide the second sample of exhaust to the nitrogen oxide sensor.

31. A system, comprising:
an aftertreatment component configured to treat exhaust exiting an engine;
a sensor configured to detect nitrogen oxide in the exhaust, the sensor positioned downstream of the aftertreatment component;
a conduit having a first end positioned upstream of the aftertreatment component and a second end communicable with the sensor positioned downstream of the aftertreatment component, wherein the conduit is configured to receive a sample of the exhaust flowing from upstream of the aftertreatment component through the first end and deliver the sample of the exhaust to the sensor through the second end; and
a switching device connected to the conduit and configurable to selectively prevent the flow of exhaust upstream of the aftertreatment component from reaching the sensor,
wherein the sensor is configured to selectively detect nitrogen oxide in the exhaust upstream of the aftertreatment component and downstream of the aftertreatment component depending upon a position of the switching device,
wherein the switching device comprises a pneumatic valve, and wherein the pneumatic valve comprises a restriction, a reservoir, and a check valve, the restriction allowing the flow of the exhaust into the reservoir, and wherein the check valve opens based on a pressure reached by the reservoir that opens the check valve.

32. A system, comprising:
an aftertreatment component configured to treat exhaust exiting an engine;
a sensor configured to detect nitrogen oxide in the exhaust, the sensor positioned downstream of the aftertreatment component;
a conduit having a first end positioned upstream of the aftertreatment component and a second end communicable with the sensor positioned downstream of the aftertreatment component, wherein the conduit is configured to receive a sample of the exhaust flowing from upstream of the aftertreatment component through the first end and deliver the sample of the exhaust to the sensor through the second end; and
a switching device connected to the conduit and configurable to selectively prevent the flow of exhaust upstream of the aftertreatment component from reaching the sensor, wherein the sensor is configured to selectively detect nitrogen oxide in the exhaust upstream of the aftertreatment component and downstream of the aftertreatment component depending upon a position of the switching device, wherein the switching device comprises a fluidic oscillator.

33. An engine system, comprising:
an engine;
a selective catalytic reduction catalyst configured to treat exhaust exiting the engine;
a sensor configured to detect nitrogen oxide in the exhaust, the sensor positioned downstream of the selective catalytic reduction catalyst;
a sample conduit having a first end positioned upstream of the selective catalytic reduction catalyst and a second end communicable with the sensor positioned downstream of the selective catalytic reduction catalyst, wherein the sample conduit is configured to receive a sample of the exhaust that flows from upstream of the selective catalytic reduction catalyst through the first end and deliver the sample of exhaust to the sensor through the second end;
a switching device connected to the sample conduit and configurable to periodically prevent the flow of exhaust upstream of the selective catalytic reduction catalyst from reaching the sensor; and
a controller communicable with the sensor,
wherein the sensor communicates a first signal indicating engine out nitrogen oxide to the controller, and wherein the sensor communicates a second signal indicating selective catalytic reduction catalyst out nitrogen oxide to the controller, and
wherein the switching device comprises a fluidic oscillator.

34. A system, comprising:
a selective catalytic reduction catalyst configured to treat exhaust from an engine;
a nitrogen oxide sensor configured to detect nitrogen oxide in the exhaust, the nitrogen oxide sensor positioned downstream of the selective catalytic reduction catalyst;
a conduit having a first end positioned upstream of the selective catalytic reduction catalyst and a second end communicable with the nitrogen oxide sensor positioned downstream of the selective catalytic reduction catalyst, wherein the conduit is configured to receive a sample of the exhaust flowing from upstream of the selective catalytic reduction catalyst through the first end and deliver the sample of the exhaust to the nitrogen oxide sensor through the second end;
a gas sample switching device connected to the conduit and configurable to selectively prevent the flow of exhaust upstream of the selective catalytic reduction catalyst from reaching the nitrogen oxide sensor; and
a controller communicable with the nitrogen oxide sensor, wherein the nitrogen oxide sensor detects nitrogen oxide in the exhaust upstream of the selective catalytic reduction catalyst and downstream of the selective catalytic reduction catalyst depending upon a position of the gas sample switching device, and
wherein the nitrogen oxide sensor detects nitrogen oxide in the exhaust upstream of the selective catalytic reduction catalyst through the conduit when the gas sample switching device is configured to allow the flow of exhaust upstream of the selective catalytic reduction catalyst to flow through the conduit to reach the nitrogen oxide sensor,
wherein the switching device comprises a fluidic oscillator.

35. A system, comprising:
an aftertreatment component configured to treat exhaust from an engine; and
a nitrogen oxide sensor configured to receive a first sample of exhaust from upstream of the aftertreatment component and receive a second sample of exhaust from downstream of the aftertreatment component;
a conduit having a first end and a second end, the first end configured to receive at least one of the first sample of exhaust and the second sample of exhaust, the second end communicable with the nitrogen oxide sensor, and wherein the conduit transfers at least one of the first sample of exhaust and the second sample of exhaust to the nitrogen oxide sensor to detect nitrogen oxide in the received sample; and
a pump configured to transfer exhaust from one of downstream of the aftertreatment component and upstream of the aftertreatment component towards the nitrogen oxide sensor, wherein the nitrogen oxide sensor is configured to separately detect nitrogen oxide in the first sample of exhaust and in the second sample of exhaust, and
wherein exhaust from upstream of the aftertreatment component is prevented from traveling through the conduit to reach the nitrogen oxide sensor when the pump transfers the exhaust from downstream of the aftertreatment component towards the nitrogen oxide sensor, and wherein exhaust from downstream of the aftertreatment component is prevented from traveling through the conduit to reach the nitrogen oxide sensor when the pump transfers the exhaust from upstream of the aftertreatment component towards the nitrogen oxide sensor.

36. The system of claim 35, wherein the pump is a dual direction pump configured to pump in a forward direction to provide the first sample of exhaust to the nitrogen oxide sensor and pump backwards to provide the second sample of exhaust to the nitrogen oxide sensor.

* * * * *